April 29, 1969     L. C. WILLIAMS     3,441,478
FUEL ELEMENT FOR NEUTRONIC REACTOR AND
METHOD OF FABRICATION THEREOF
Filed March 29, 1968
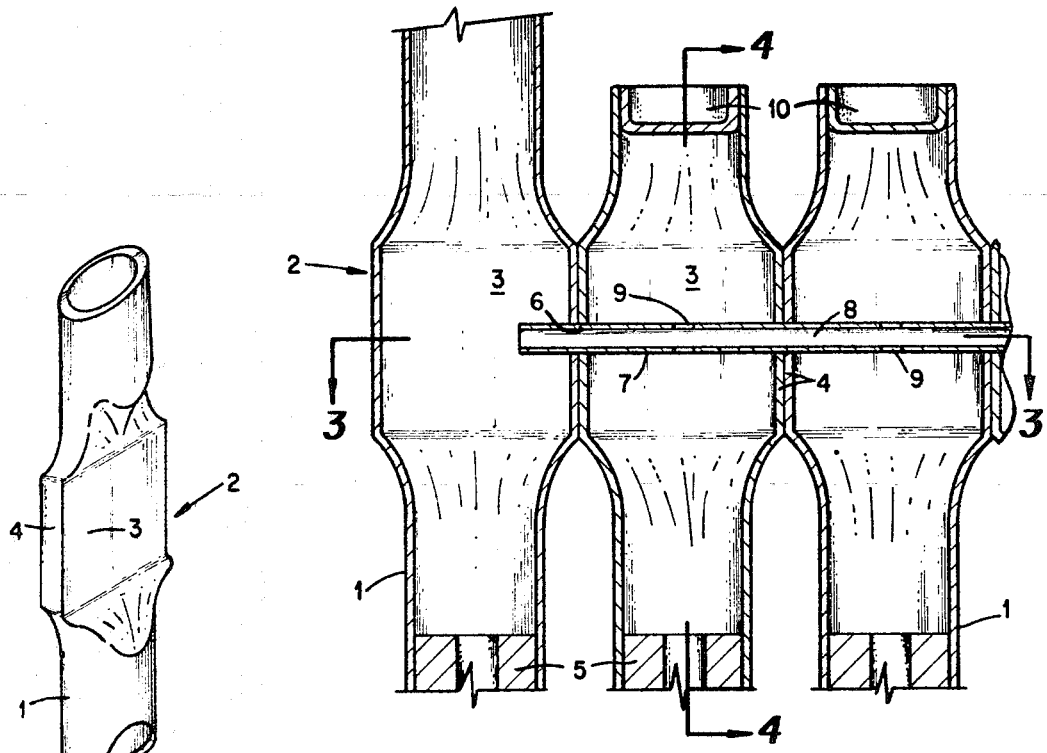
Fig. 2
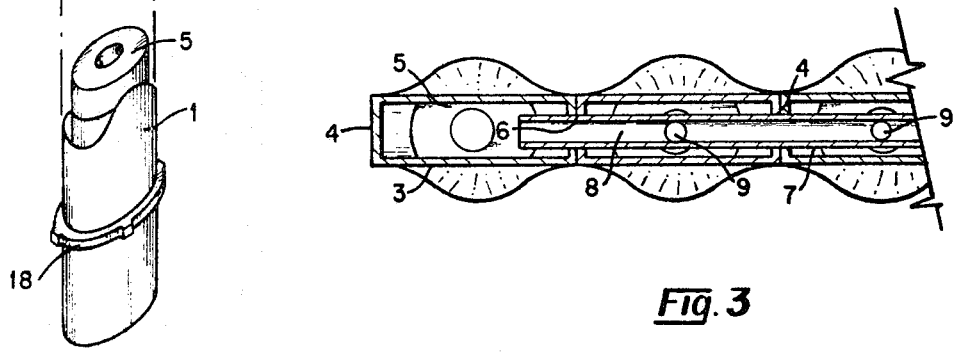
Fig. 3
Fig. 1
INVENTOR.
Leonard C. Williams
BY
ATTORNEY.

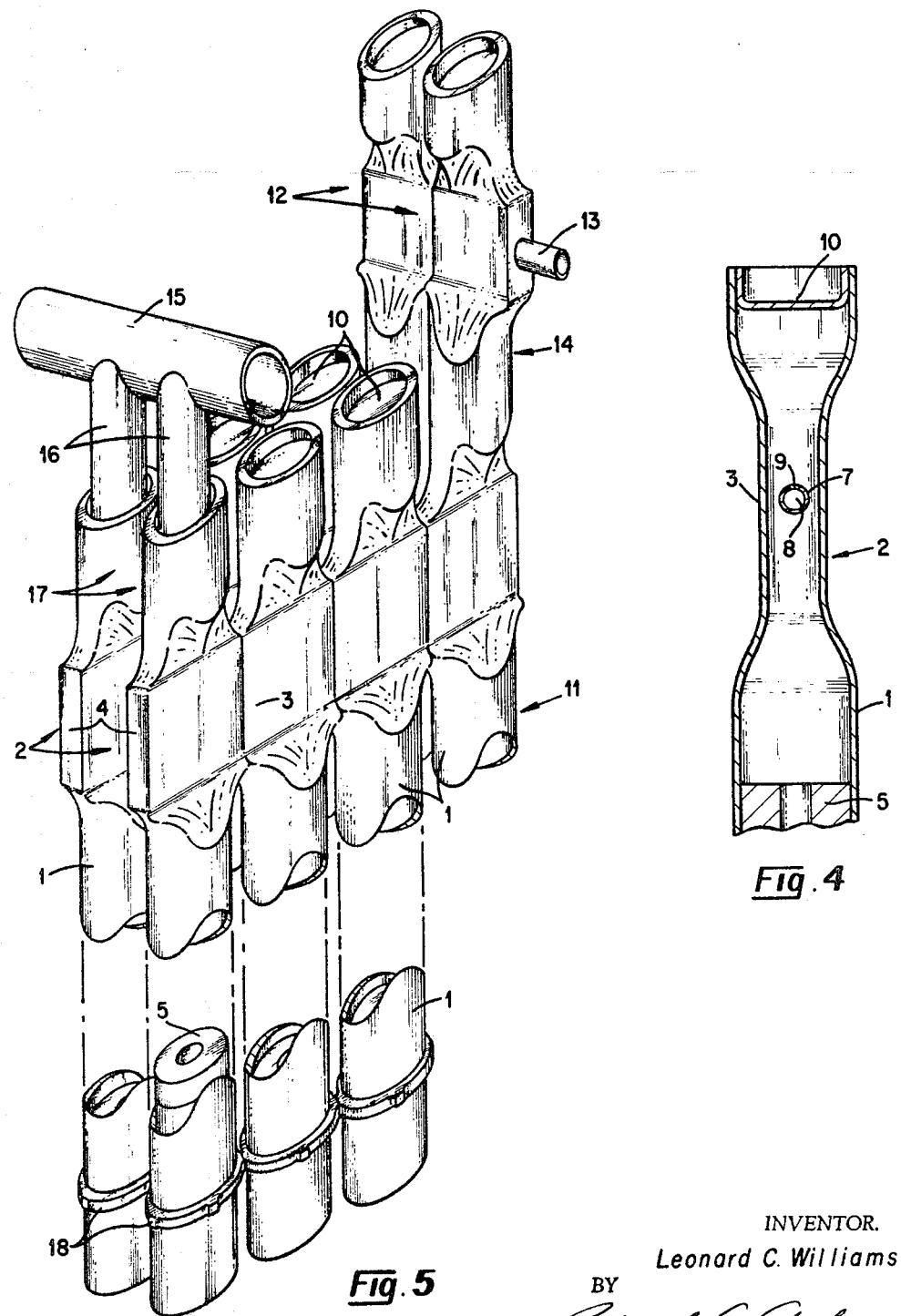

United States Patent Office 3,441,478
Patented Apr. 29, 1969

3,441,478
FUEL ELEMENT FOR NEUTRONIC REACTOR AND METHOD OF FABRICATION THEREOF
Leonard C. Williams, Clinton, Tenn., assignor to the United States of America as represented by the United States Atomic Energy Commission
Filed Mar. 29, 1968, Ser. No. 717,115
Int. Cl. G21c 3/30, 19/02, 3/02
U.S. Cl. 176—78                9 Claims

ABSTRACT OF THE DISCLOSURE

An integral fuel pin and grid structure for pin-type neutronic reactor fuel elements. Substantially cylindrical fuel pins are deformed into a rectangular cross section along a short segment of the pins adjacent to but spaced apart from one end thereof. The fuel pins are positioned in a row in an abutting relationship along the smaller faces of their deformed rectangular segments, with a connector pin extending along the length of the row through apertures in the abutting faces. The fuel pins are then brazed to one another along the abutting faces to form a row of integrally connected fuel pins. A plurality of such rows of fuel pins arranged in a side-by-side relationship form a fuel element. Where a vented fuel element is desired, the connector pin in each row of fuel pins may be tubular in form and provided with radial apertures so that fuel pin fluid intercommunication is provided. At least one fuel pin in each row of fuel pins is then vented to an external gas collection system.

Background of the invention

The invention described herein relates generally to neutronic reactor fuel elements and more particularly to an integral fuel pin and grid structure suitable for vented operation and a method of fabrication thereof. It was made in the course of, or under, a contract with the U.S. Atomic Energy Commission.

Fuel elements containing a multiplicity of fuel pins are commonly known and widely used in neutronic reactors. The particular mechanisms used for supporting the pins within a fuel element must prevent excessive vibration by the pins, minimize pressure drop of coolant flow, and be easily fabricated with the pins into a fuel element The principal disadvantage of prior art pin-type fuel elements is that they are difficult to fabricate. This is particularly true in fuel elements wherein the individual fuel pins are vented for removal of gaseous fission products. Fabrication of such fuel elements has typically required a great number of individual welding and other joining operations. An improved fuel element which reduced and simplified the fabrication operations is described in the copending application Ser. No 717,236, filed Mar. 29, 1968, of common assignee. In that application, however, some fabrication problems still remain including the alignment of tubes during joining; possible embrittlement of the metal cladding or formation of microracks; the machining out of deformed wall portions, and closing the tops of the tubes, particularly where the crimping method taught therein is utilized.

It is, accordingly, a general object of the invention to provide a pin-type fuel element that is readily fabricated, and more specifically to provide such fuel element which is suitable for use in a vented system.

Summary of the invention

In accordance with the invention, a readily fabricated, pin-type neutronic reactor fuel element is provided which is suitable for vented operation. Substantally cylindrical fuel pins are deformed into a rectangular cross section along a short segment of the pins adjacent to but spaced apart from one end thereof. After being deformed, the fuel pins are positioned in a row in an abutting relationship along the smaller faces of their deformed rectangular segments, with a connector pin extending along the length of the row through apertures in the abutting faces. The fuel pins are then brazed to one another along the abutting faces to form a row of integrally connected fuel pins. A plurality of such rows of fuel pins are arranged in a side-by-side relationship to form a fuel element. Where a vented fuel element is desired, the connector pin may be tubular in form and provided with radial apertures so that fuel pin fluid intercommunication is provided. At least one fuel pin in each row of fuel pins is then vented to an external gas collection system.

Brief description of the drawings

FIG. 1 is an isometric view of a single fuel pin deformed in accordance with the invention.

FIG. 2 is a longitudinal sectional view of a row of fuel pins as shown in FIG. 1, assembled in accordance with the invention.

FIG. 3 is a transverse sectional view of the row of assembled fuel pins of FIG. 2 taken along line 3—3.

FIG. 4 is a vertical sectional view of a single fuel pin taken normal to the plane of FIG. 2 along line 4—4.

FIG. 5 is an isometric view of two rows of fuel pins fabricated according to the invention and illustrating two alternative methods of joining a plurality of such rows to a common manifold.

Description of the preferred embodiment

Referring initially to FIG. 1, an otherwise conventional tubular casing 1 for a cylindrical fuel pin is provided with a deformed portion 2 adjacent to, but spaced apart from, its top end. Deformed portion 2 has a rectangular cross section with lateral faces 3 and 4 having greater and lesser lengths, respectively. Sides 3 are restricted to a length which is greater than the diameter of the remaining circular cross section portion of casing 1 so that, as shown in FIGS. 1, 2 and 3, the deformed portion 2 extends radially outward beyond the circular cross section portion. The sum of the lengths of lateral faces 3 and 4 remains approximately equal to the circumference of the remaining circular cross section portion. The deforming or shaping operation used to form the rectangular cross section of deformed portion 2 may be performed by conventional methods. After loading of fuel pellets 5 into casing 1, the bottoms of the tubes may be closed by welding end caps (not shown) of conventional design thereto. Such loading of fuel pellets, although shown in FIG 1 for illustrative purposes, is not accomplished until a multiplicity of such fuel pins have been fabricated into an integral grid structure or fuel element according to the invention as described hereafter.

A plurality of tubular casings 1 similar to that shown in FIG. 1, but without fuel pellets 5 being loaded therein, are assembled as shown in FIG. 2 into a row with their faces 4 abutting. Apertures 6 are provided in each abutting face 4 of casing 1 in register with corresponding apertures in adjoining casings. The apertures may be provided before assembling the casings in a row, or after such assembly to facilitate an exact alignment of the apertures permitting the positioning of a connecting pin 7 therethrough as shown in FIGS. 2, 3 and 4. Pin 7 may be solid, or, where vented operation of the pins is desired, tubular in form with a central bore 8 and radial perforations 9 communicating with the interior of each fuel pin as shown in FIGS. 2, 3 and 4. Pin 7 and apertures 6 are sized for a close fit when pin 7 is inserted as shown in order to provide precise alignment of the fuel pins before they are metallurgically bonded, and to minimize the possibility of any gaseous fission products escaping from the fuel pins.

A typical fuel element may have fifteen rows of fuel pins, with each row in turn having fifteen pins. Each row is formed separately by prepositioning a multiplicity (fifteen for example) of fuel pins in an abutting relationship with a pin 7 passing through the row. A cap 10, comprising of flat base portion and an upstanding rim protion, is then positioned as shown in each casing 1 to sealably close the top ends of the fuel pins. The caps 10 are then joined to casing 1 and abutting faces 4 joined to each other by brazing or other suitable metallurgical bonding techniques. The brazing operation also seals around pin 7 where it passes through apertures 6. After this brazing operation, the integrity of the joints in each row of fuel pins is checked with conventional leak-testing procedures.

Two different header arrangements for joining a plurality of rows of fuel pins into an integral fuel element are shown in FIG. 5 for illustrative purposes. Ordinarily, of course, only one header arrangement will be utilized in a single fuel element. Only two rows and a limited number of fuel pins are shown in order to simplify the drawing while fully illustrating the inventive concept. According to one arrangement, the end fuel pin 11 is extended and provided with a second deformed portion 12 similar to but having its long dimension oriented at right angles to deformed portion 2. The second deformed portion 12 is joined to a corresponding second deformed portion of an adjacent row of pins in the same manner as described above in reference to joining adjacent fuel pins within a row of fuel pins. An internal connecting pin 13 similar to pin 7 passes through the second deformed portion and, where vented operation is desired, acts as a gas collection manifold to collect fission product gases from the rows of fuel pins. The cylindrical transition region 14 between the first and second defromed portions of the end fuel pin 11 is hollow and thus facilitates the flow of gaseous fission products between the pins. One pin of end pin 11 is in turn vented to a suitable central manifold (not shown) for collecting fission product gases from a multiplicity of fuel elements within a neutronic reactor.

According to a second arrangement, a tubular manifold 15 is provided with spaced tubular extensions 16 which mate with an end fuel pin 17 in each row of fuel pins. Manifold 15 is in turn vented to a central manifold (not shown) as in the first arrangement.

Although each header arrangement is shown joined to the end fuel pin in a row of fuel pins, other arrangements could also be used wherein other pins within the row could be directly connected to a header. Each fuel element may require more than one header arrangement joined the rows of fuel pins in some instances.

Following the above described fabrication steps, fuel pellets 5 are loaded into the tubular casings through their lower ends which are then closed and sealed with conventional end caps. Spacer rings 18 are provided about the lower ends of the fuel pins to stabilize them.

The above described construction thus provides an integral pin-type fuel element which is readily fabricated and which is suitable for, but not restricted to, vented operation.

The above description of the invention was offered for illustrative purposes only, and shoud not be interpreted in a limiting sense. It is intended rather that the invention be limited only by the claims appended hereto.

What is claimed is:

1. A pin-type fuel element for use in a nuclear reactor comprising:
    (a) a multiplicity of substantially cylindrical fuel pins, each of said fuel pins being deformed into a first shape having a rectangular cross section defining larger and smaller flat lateral faces along a short segment of said pins adjacent to but spaced apart from one end thereof;
    (b) said fuel pins being disposed in a plurality of adjacent rows, each of said fuel pins within each of said rows abutting with at least one adjacent fuel pin in said row along at least one of said flat lateral faces of said deformed shape;
    (c) a connecting pin transversely penetrating each of said abutting flat lateral faces of said fuel pins in each of said rows of fuel pins;
    (d) said fuel pins being metallurgically bonded to each other along said abutting flat lateral faces; and
    (e) means for joining a plurality of said rows of fuel pins to form a fuel element.

2. The fuel element of claim 1 wherein said one end of each of said fuel pins adjacent to said first deformed shape is closed with a cap, said cap comprising a flat base portion and an upstanding rim portion, said rim portion being metallurgically bonded to said one end of said fuel pin.

3. The fuel element of claim 1 wherein said connecting pin is hollow and is provided with radial perforations to provide fluid communication between the interior of said tubulation and the interiors of said fuel pins within said row.

4. The fuel element of claim 1 wherein said larger flat lateral faces have lengths greater than the diameter of a corresponding substantially cylindrical fuel pin, said smaller flat lateral faces having lengths less than the diameter of said fuel pin; each of said fuel pins being metallurgically bonded to at least one other of said fuel pins along at least one of said faces having a length less than the diameter of said fuel pin.

5. The fuel element of claim 1 wherein said means for joining a plurality of said rows of fuel pins comprises at least one of said fuel pins in each of said rows being deformed into a second shape having a rectangular cross section defining larger and smaller flat lateral faces, said second deformed shape being axially spaced apart from said first deformed shape, each of said fuel pins having said second deformed shape abutting with at least one fuel pin in an adjacent row along at least one of said flat lateral faces of said second deformed shape; a second connecting pin transversely penetrating said abutting flat lateral faces of said second deformed shape; said abutting flat lateral faces being metallurgically bonded to each other.

6. The fuel element of claim 5 wherein said fuel pins and said rows of fuel pins are in fluid communication through said first and second deformed shapes.

7. The fuel element of claim 5 wherein said first and second deformed shapes are oriented at right angles to each other.

8. The fuel element of claim 1 wherein said means for joining a plurality of said rows of fuel pins comprises a manifold and spaced tubular extensions extending from said manifold to at least one fuel pin within each of said rows of fuel pins, said tubular extension being metallurgically bonded to and in fluid communication with said fuel pin.

9. A method of fabricating a pin-type fuel element suitable for vented operation comprising:
    (a) deforming a segment of a multiplicity of substantially cylindrical fuel pins into a shape having a rectangular transverse cross section and defining flat lateral faces having greater and lesser lengths with respect to each other, said deformed segment being adjacent to but spaced apart from one end of said fuel pins;
    (b) arranging a plurality of said pins in a row with adjacent fuel pins abutting along said flat lateral faces having lesser lengths;
    (c) disposing a connecting pin transversely through said abutting flat lateral faces;

(d) placing caps in said one end of said fuel pin adjacent to said deformed segment;
(e) providing a metallurgical bond between adjacent fuel pins along said abutting faces and between said caps and said fuel pins; and
(f) joining a plurality of said rows of fuel pins to form a fuel element.

References Cited

UNITED STATES PATENTS

| | | | |
|---|---|---|---|
| 2,346,376 | 4/1944 | Heavener | 29—157.4 X |
| 2,429,888 | 10/1947 | Moore | 29—157.4 |
| 3,031,388 | 4/1962 | Barchet | 176—78 X |
| 3,138,536 | 6/1964 | Murray et al. | 176—78 X |
| 3,206,369 | 9/1965 | Fortescue et al. | 176—78 X |
| 3,212,990 | 10/1965 | Murtha | 176—78 |

CARL D. QUARFORTH, *Primary Examiner.*

MELVIN J. SCOLNICK, *Assistant Examiner.*

U.S. Cl. X.R.

29—157.4, 480, 482; 176—37, 68